United States Patent [19]

Hutchings

[11] Patent Number: 4,715,713

[45] Date of Patent: Dec. 29, 1987

[54] PATH LENGTH ADJUSTER FOR RING LASER GYRO

[75] Inventor: Thomas J. Hutchings, Canoga Park, Calif.

[73] Assignee: Litton Systems Inc., Beverly Hills, Calif.

[21] Appl. No.: 750,425

[22] Filed: Jun. 28, 1985

[51] Int. Cl.$^4$ ............................................ G01C 19/64
[52] U.S. Cl. .................................................... 356/350
[58] Field of Search ........................................ 356/350

[56] References Cited

U.S. PATENT DOCUMENTS 4,386,853  6/1983  Ljung ................................... 356/350
4,422,762  12/1983  Hutchings ........................... 356/350

Primary Examiner—Davis L. Willis
Assistant Examiner—S. A. Turner
Attorney, Agent, or Firm—Roy L. Brown

[57] ABSTRACT

Apparatus for maintaining the length of a ring laser path and of its branches substantially constant during temperature and stress changes, using forcers directed outward toward the apexes of the ring laser and perpendicular to the laser path.

26 Claims, 8 Drawing Figures

PATH LENGTH ADJUSTER FOR RING LASER GYRO

BACKGROUND OF THE INVENTION

The apparatus of this invention uses some of the principles recited in U.S. Pat. No. 4,436,423.

A ring laser gyroscope generally includes mirrors for reflecting laser beams along a laser cavity. The laser cavity is frequently triangular or rectangular, and the mirrors are positioned at the intersections of the straight portions of the cavity. Because of irregularities on the surfaces of the mirrors, a beam impinging upon a particular mirror is not perfectly reflected. Rather, some back-scattering occurs. This causes errors in the gyro at high rotation rates and also causes the beat frequency between two beams in the gyroscope to disappear at low inertial rotation input rates. Such disappearance is called lock-in which has been recognized for some time in the prior art and has been solved by driving the gyroscope body in rotational oscillation or dither. The means for accomplishing the dither conventionally includes a piezoelectric actuator connected to a suspension for the gyroscope to oscillate the body. The frequency of oscillation is frequently at the suspension's natural mechanical resonant frequency. The dither is superimposed upon the actual rotation of the gyroscope in inertial space. Various techniques have evolved to recover inertial rotation data free from dither, but such is not part of this invention.

BRIEF DESCRIPTION OF THE INVENTION

The apparatus of this invention uses a plurality of forcers, usually piezoelectric stacks, for delivering forces to the body of a ring laser. The forces of one set of the forces are delivered directly through the apexes of the ring laser path along a line which bisects the angle between the adjacent laser path branches at the apex. The forces of a second set of the forces are delivered between the apexes and have a components perpendicular to the laser branches. The sets of forces operate in opposition, and they are scaled to keep the branches of the laser path substantially constant under temperature and stress changes. The directions of the second set of forces are not as critical as those of the first set of forces, but their direction must be accounted for in the scaling factor on the driving servo amplifiers. In a preferred embodiment, the forces are perpendicular to the branches and centered between the apexes. The length of the laser path is sensed, and sets of forcers are driven in predetermined scaled relation to maintain the lengths of the ring laser branches.

It is therefore an object of this invention to maintain the lengths of the branches of a ring laser.

It is another object of the invention to maintain the overall length of a ring laser path.

It is also an object of the invention to maintain the scatter coefficients of the various mirrors substantially constant by causing the laser signals to impinge on substantially a constant position on each mirror and to hold the distance substantially constant between adjacent mirrors, where "substantially" means on the order of tens of Angstroms.

Other objects will become apparent from the following description, taken together with the accompanying drawings.

PREFERRED EMBODIMENT OF THE INVENTION

Figure 1:
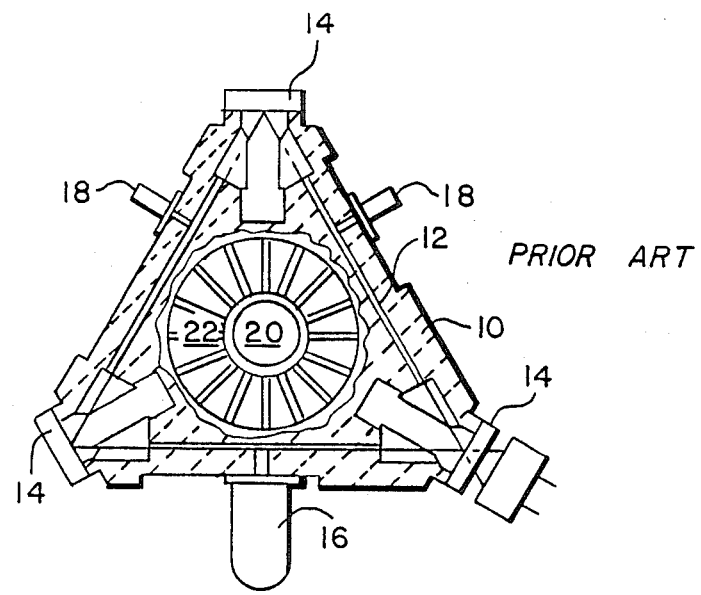
FIG. 1 is a drawing, partly in section, showing a typical three branched ring laser gyro.

FIG. 1 shows a prior art ring laser used in a ring laser gyro. The laser is typically embedded in a dimensionally stable quartz or glass-ceramic block 10 having a channel 12 therein supporting the ring laser path. The channel 12 is sealed and contains, typically a mixture of neon and helium which is then energized into lasing. To create the laser path, mirrors 14 are positioned at the vertexes or corners of the laser body 10. The apparatus shown is a symmetrical one, and that is a typical and usually preferred embodiment. The energy may be supplied to the laser gas by channeling an electron stream between a cathode 16 and a pair of anodes 18 to produce two counterpropagating laser signals within the ring laser. The entire laser body may be supported upon a post 20 on its supporting vehicle or laboratory bench, and a plurality of flexure springs, shown generally at 22, may optionally be connected between the body 10 and the post 20 to allow the body 10 to be dithered angularly as desired.

The apparatus of this invention is directed to the problem of keeping the lengths of the laser branches substantially constant. To that end, if the laser path is a regular polygon, and if the laser body 10 is substantially symmetrical, once initial adjustments are made, it may be assumed that temperature and stress effects will be substantially the same for each branch, and so long as the forcers of this invention are also symmetrically positioned, the control signals applied to the forcers may be substantially identical. When asymmetries occur, individual scaled amplifiers and forcers may be needed, and a calibration may be needed before the apparatus of the invention operates properly to correct for changes in branch length.

The objective of the invention is to prevent such changes in branch length because changes in branch length would cause the laser signals to impinge at different angles and at different places on the corner mirrors of the laser, thereby varying the scattering and hence affecting the lockin and lockin compensation on the ring laser gyro.

Figure 2:
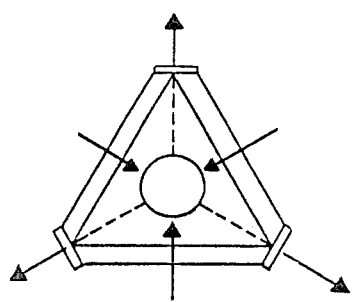
FIGS. 2 and 3 are schematic sketches of a three branched ring laser used for explaining the operation of the invention.
Figure 3:
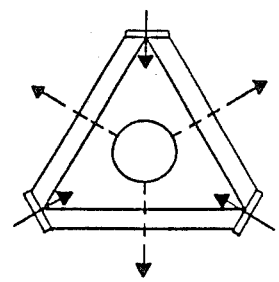

In the symmetrical ring laser gyro shown in FIGS. 2 and 3, note that the two sets of forces from the forcers of this invention are operated in opposition or push pull to distend the laser frame. That is, the forces which are directed through the apexes of the ring laser either are directed outwardly as in FIG. 2 or inwardly as in FIG.

3, and the forces centered on the laser branches are directed perpendicular to the branches and substantially at their center point between the apexes or corners but with a sense that is opposite to that of the forces directed at the apexes. The forces of the forcers are typically manually preloaded so that the forcers operate around a predetermined preloaded force.

Figure 4:
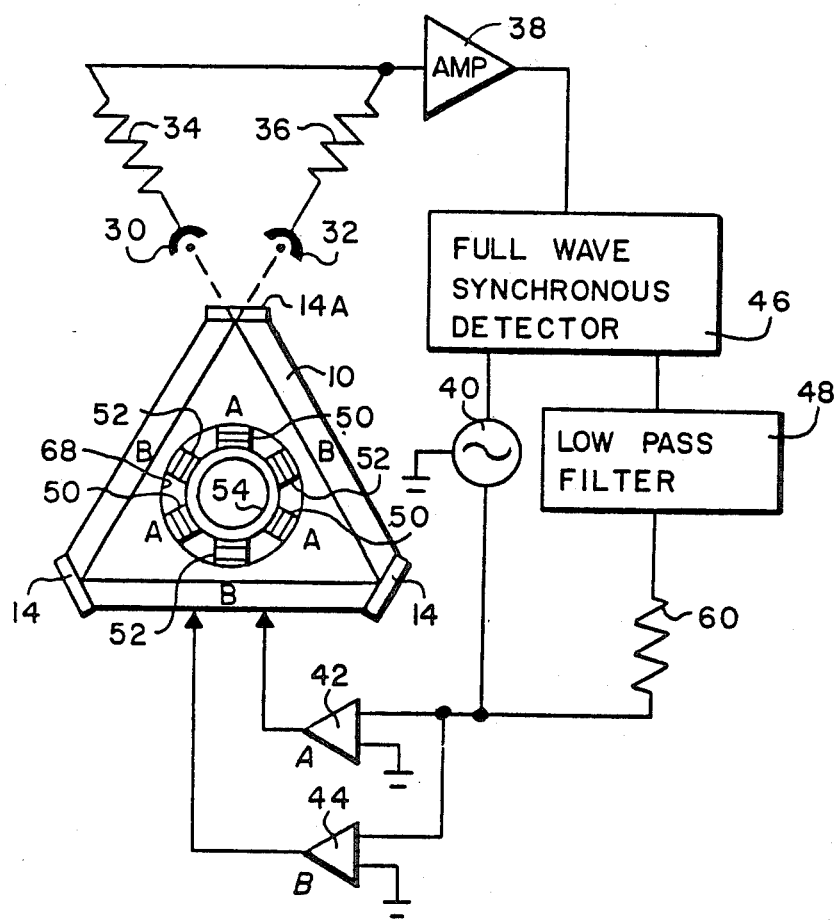
FIG. 4 shows a symmetrical three branched ring laser gyro with a typical forcer arrangement and servo according to this invention.

FIG. 4 shows an equilateral triangular ring laser path with a set of six forcers in two sets, labeled A and B. Portions of the two counterpropagating ring laser signals are extracted through one of the corner mirrors 14A. The two counterpropagating signals are directed into two photosensors 30,32, and the photosensor signals are summed through summing resistors 34,36 and summing amplifier 38. A modulating alternating voltage source 40 is used as a carrier for signals in the servo amplifiers 42,44 and for detection on the synchronous detector 46. The output of amplifier 38 is connected through detector 46 to the low pass filter 48 which has a pass frequency lower than the frequency of the source 40. The control signals from the filter 48 are a measure of the length of the path of the laser 10.

The forcers 50 and 52 are forced between a ring 54 and the body of the laser 10. In one embodiment wherein servo amplifiers 44 have the same polarity, the forcers 50 and 52 are oppositely poled. In another embodiment, where the forcers are poled in the same direction, one of the amplifiers 42,44 produces an inverted signal.

The control signal from the filter 48 is connected through the resistor 60 to the inputs of the amplifiers 42 and 44. That control signal, as well as the carrier signal from the source 40, are delivered to the forcers 50 and 52 as shown by the symbols A and B in FIG. 4.

Figure 6:
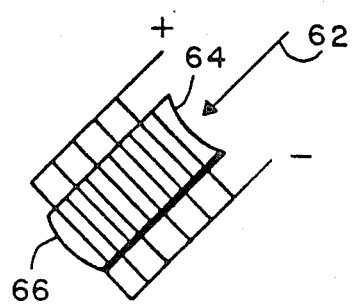
FIG. 6 shows a typical piezoelectric forcer stack.

A typical forcer is shown in FIG. 6. A plurality of piezoelectrical crystals are stacked as shown at 62. The inner surface 64 is preferably contoured to match the ring 54, and the outer surface 66 is preferably contoured to match the inner surface 68 of the body of the ring laser 10.

Figure 7:
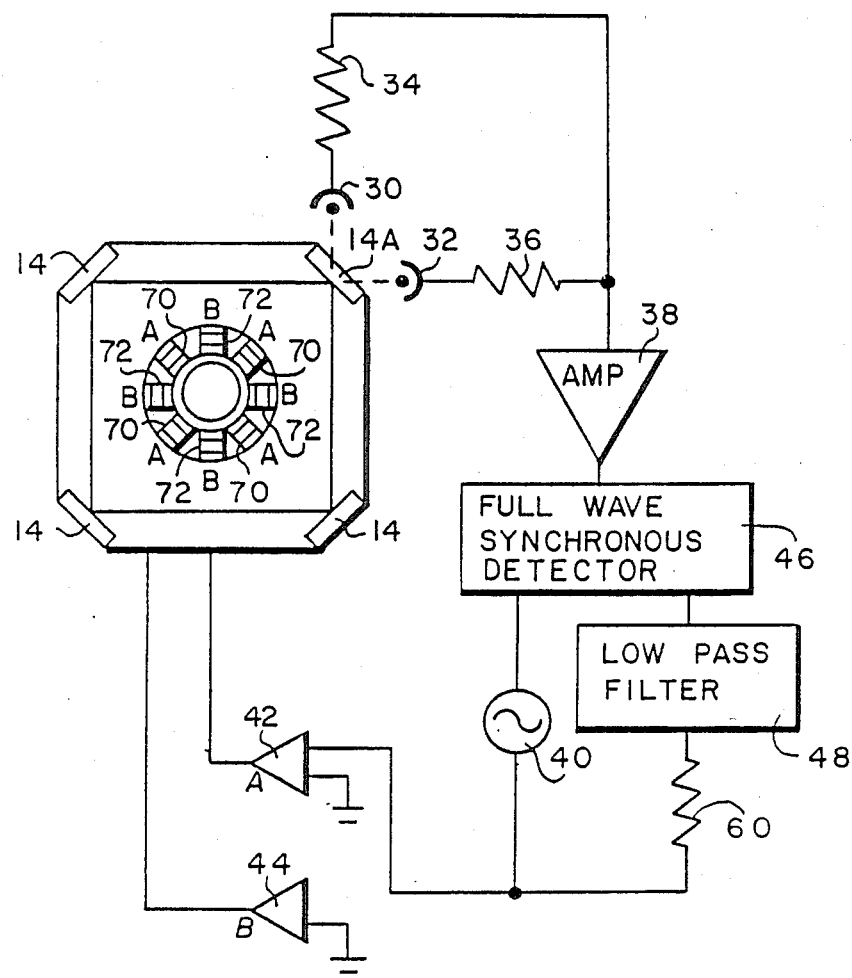
FIG. 7 shows a symmetrical four branched ring laser gyro with a typical forcer arrangement and servo according to this invention.

FIG. 7 is similar to FIG. 4 except that a square laser path is configured. Eight forcers 70, 72 are used instead of the six of FIG. 4. The amplifiers 42,44 drive the forcers 70,72, and they are properly scaled to do so. Note that no two configurations would have the same scale factor.

Figure 8:
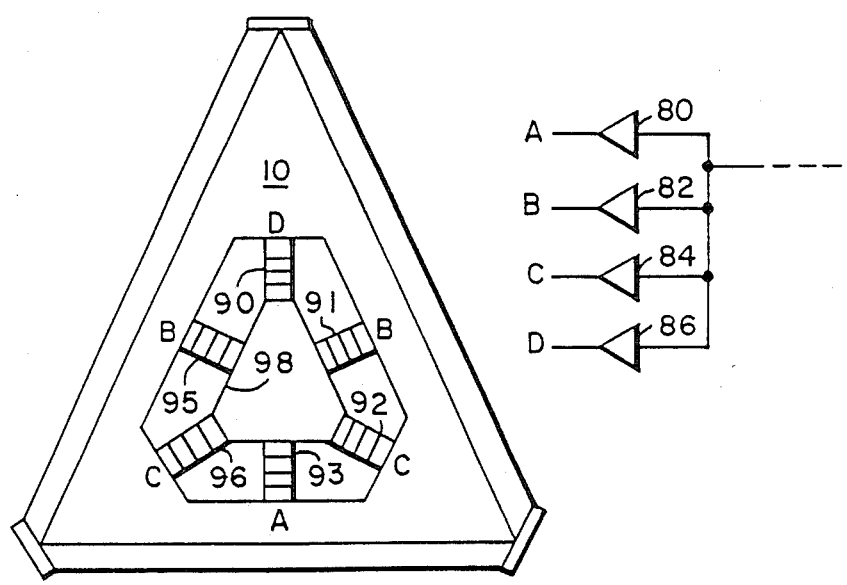
FIG. 8 shows an asymmetrical, for example an isosceles shaped laser path, ring laser gyro with driving servo amplifiers according to this invention.

FIG. 8 demonstrates the complexity that arises when the ring laser become asymmetric. This is a simple isosceles triangular ring laser path. Because of the different path lengths and because of the different thicknesses of the ring laser body where the forces from the forcers are applied, different forces are applied by different forcers. In a comletely asymmetric situation there would need to be a separate servo amplifier for each forcer, but an isosceles triangle still has some symmetry, whereby only four amplifiers would be needed. The remainder of the servo circuit would typically be the same as that shown in FIGS. 4 and 7 with the outputs of the carrier source 40 and the resistor 60 both delivered to the inputs of each of the servo amplifiers 80,82,84,86. In FIG. 8, the outputs of the various servo amplifiers are marked A,B,C and D to show that they deliver signals to the corresponding forcers likewise so labeled. The forces of forcers 90, 92,96 should be directed outwardly when the forces of forcers 91, 93, 95 are directed inwardly. A bridge structure 98 is placed centrally of the laser so that the forcers have purchase to apply force to the body 10 of the ring laser. In the aforecited example of non-symmetry it may be required to use a method of theoretical mechanical deformation analysis to design the optimal mechanical compliance of the laser frame such that the forces are effective at distending the frame in the desired manner. The method may be that of finite element modeling as shown in "The finite Element Method in Engineering Science" by O. C. Zienkiewicz, 1971.

Figure 5:
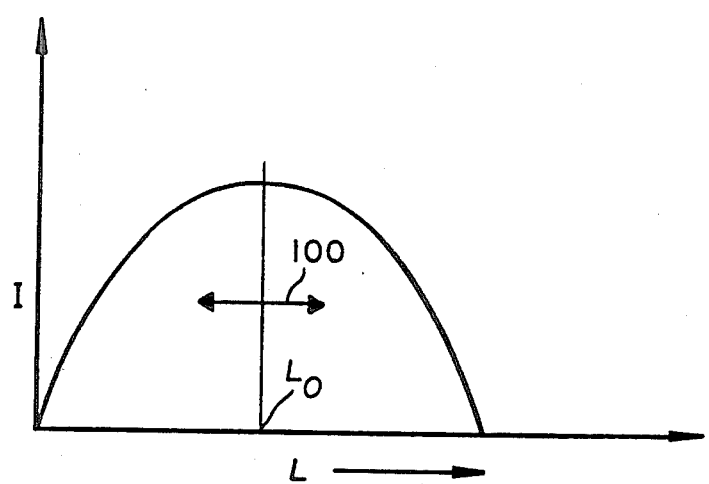
FIG. 5 is a graph of intensity of laser signal as a function of length adjustment for a typical ring laser.

FIG. 5 shows typically how the intensity of the laser signal varies with a change in length of the laser path. The servo of FIGS. 4 and 7, and also used in FIG. 8, controls the path length to a substantially fixed length $L_o$.

In operation, as the source 40 delivers a signal to the servo amplifiers, and hence to the forcers, the lengths of the laser branches are dithered slightly as shown at 100 in FIG. 5. Variations in amplitude are sensed by the detector 46 and delivered through the filter 48 to the servo amplifiers 40,42 to produce a differential force on the body 10 of the laser to keep the lengths of the path branches substantially constant.

Although the apparatus of the invention has been described in detail above, it is not intended that the invention be limited by that description, but only according to the appended claims.

I claim:

1. A ring laser comprising;
    a substantially rigid laser body block, including openings formed therein containing lasing material defining at least three substantially straight intersecting path branches, said intersections defining corners of a ring laser path;
    at least three corner-mirrors, equal in number to said intersections, each rigidly supported by said body block at separate said corners, said mirrors being positioned and angled to reflect laser radiation in said ring laser path;
    means for delivering energy to said lasing material;
    a first plurality of forcer means, one for each of said corners, each positioned to apply a force between the other said forcer means of that said first plurality of forcer means, and said rigid laser body block along lines of action intersecting said mirrors and bisecting the angles between the respective adjacent laser path branches;
    a second plurality of forcer means, one for each of said branches, each positioned to apply a force between the other said forcer means, of said second plurality of forcer means, and said rigid laser body block along lines of action intercepting said branches;
    the forces of said first and second plurality of forcer means being adjusted to compensate for changes in length of said total laser path.

2. Apparatus as recited in claim 1 wherein said forcer means are further adjusted and distributed to compensate for changes in length of each of said individual branches.

3. Apparatus as recited in claim 1 and further comprising:
    measuring means for measuring the total length of said laser path; and
    servo means connected between said measuring means and said forcer means to servo the length of said laser path to a constant total length.

4. Apparatus as recited in claim 3 in which the forces of said forcer means are distributed in a predetermined ratio to keep the lengths of each of said branches substantially constant.

5. The apparatus recited in claim 4 wherein the forces of said first plurality of forcer means oppose the effect of the forces of said second plurality of forcer means.

6. Apparatus as recited in claim 2 and further comprising:
   measuring means for measuring the length of each of said branches; and
   servo means, connected between said measuring means and said forcer means to keep the lengths of each of said branches substantially constant.

7. Apparatus as recited in claim 5 wherein said ring laser has a path that is substantially a regular polygon.

8. Apparatus as recited in claim 7 wherein the forcers of said second plurality of forcer means apply forces substantially at the midpoints of said branches, these forces varying about predetermined preloaded forces.

9. Apparatus as recited in claim 8 wherein the lines of action of the forces of said second plurality of forcer means are applied at substantially the same angle relative to their respective branches.

10. Apparatus as recited in claim 9 wherein the lines of action of the forces of said second plurality of forcer means are applied substantially normal to said branches and substantially in the plane of the polygon of said laser path.

11. Apparatus as recited in claim 10 wherein the amplitudes of the counterpropagating optical signals in said ring laser are synchronously modulated, detected, added, demodulated, and filtered to produce a bipolar control signal indicative of deviation of the length of said laser path from a predetermined length;
   said bipolar signals are delivered through a first servo amplifier to control the forces of said first plurality of forcer means and delivered through a second servo amplifier to control the forces of said second plurality of forcer means.

12. Apparatus as recited in claim 11 in which said servo amplifiers are scaled to deterined the ratio of forces delivered by said first and second plurality of forcer means.

13. Apparatus as recited in claim 12 in which said forcer means are oppositely poled.

14. Apparatus as recited in claim 12 in which said forcer means are poled the same, and said bipolar signals delivered to said second servo amplifier are inverted.

15. In a ring laser having a regular polygon and planar geometry of laser path, including at least three corners and at least three branches between said corners, lasing material in said path, means for energizing said lasing material, and at least three corner mirrors, one at each said corner, the improvement comprising:
   a substantially circular aperture formed in said rigid body around the centroid of said polygonal laser path and within said path;
   a substantially rigid substantially circular support ring having a diameter smaller than said aperture;
   a first plurality of piezoelectric forcer members positioned between said ring and said body with their force axes directed substantially at said corners;
   a second plurality of piezoelectric forcer members positioned between said ring and said body with their force axes directed substantially at the centers of said branches of said path of said ring laser between said corners.

16. Apparatus as recited in claim 15 in which said forcer members are substantially identical.

17. Apparatus as recited in claim 16 in which said forcer members are oppositely poled.

18. Apparatus as recited in claim 16 in which said forcer members are poled the same.

19. Apparatus as recited in claim 17 and further comprising
   means for modulating, at a predetermined low frequency, the frequency of the laser radiation;
   means for detecting the low frequency so-induced amplitude modulation of the counterpropagating laser waves in said ring laser and for producing amplitude signals;
   means for summing said detected amplitude signals to produce a summed signal;
   means for demodulating said summed signal;
   means for removing the alternating components from said summed signal to leave a control signal that is a measure of the deviation of the laser path from a predetermined nominal length;
   first and second scaled servo amplifiers connected to receive and scale said control signal to produce and deliver said scaled control signals to said forcer members.

20. Apparatus as recited in claim 18 and further comprising means for modulating, at a predetermined low frequency, the frequency of the laser radiation;
   means for detecting the low frequency so induced amplitude modulation of the counterpropagating laser waves in said ring laser and for producing amplitude signals;
   means for summing said detected amplitude signals to produce a summed signal;
   means for demodulating said summed signal;
   means for removing the alternating components from said summed signal to leave a control signal that is a measure of the deviation of the laser path from a predetermined nominal length;
   a first scaled servo amplifier connected to receive and scale said control signal and to deliver said scaled control signal to said first plurality of forcer members;
   and a second scaled servo amplifier, including a signal inverter, connected to receive, invert and scale said control signal and to deliver said inverted and scaled control signal to said second plurality of forcer members.

21. Apparatus as recited in claim 1 in which:
   said path branches are substantially coplanar;
   a substantially circular aperture is formed in said rigid laser body block around the centroid of said polygonal laser path and within said path;
   additionally comprising a substantially rigid substantially circular support ring, having a diameter smaller than said aperture, positioned within said aperture;
   said first plurality of forcer means being positioned between said ring and said body with their force axes directed along lines of action that substantially intercept said corners;
   said second plurality of forcer means being positioned between said ring and said body with their force axes directed substantially at the centers of the branches of the path of said ring laser between said corners.

22. Apparatus as recited in claim 21 in which said forcer means are substantially identical forcers.

23. Apparatus as recited in claim 22 in which said first and second pluralities of forcer means are oppositely poled.

24. Apparatus as recited in claim 22 in which said first and second pluralities of forcer means are poled the same.

25. Apparatus as recited in claim 23 and further comprising means for modulating, at a predetermined low frequency, the frequency of the laser radiation;

means for detecting the low frequency component of the so induced amplitude modulation of the counterpropagating laser waves to create amplitude signals;

means for summing the detected amplitude signals to produce a summed signal;

means for demodulating said summed signal;

means for removing the alternating component from said summed signal to produce a control signal that is a measure of the deviation of the length of the laser path from a predetermined nominal length;

first and second scaled servo amplifiers connected to receive and scale said control signal and to deliver said scaled control signals to said forcer means.

26. Apparatus as recited in claim 24 and further comprising means for modulating the frequency of the lasing radiation at a predetermined low frequency;

means for detecting the low frequency so induced amplitude modulation of the counterpropagating laser waves;

means for summing the detected amplitudes to produce a summed signal;

means for demodulating said summed signal;

means for removing the alternating component from said summed signal to produce a control signal that is a measure of the deviation of the length of the laser path from a predetermined nominal length;

a first scaled servo amplifier connected to receive and scale said control signal and to deliver said scaled control signal to said first plurality of forcer means;

and a second scaled servo amplifier, including a signal inverter, connected to receive, invert and scale said control signal and to deliver said inverted and scaled control signal to said second plurality of forcer means.

* * * * *